(12) United States Patent
Ramanan

(10) Patent No.: US 6,208,970 B1
(45) Date of Patent: Mar. 27, 2001

(54) METHOD AND SYSTEM FOR ESTIMATION OF A SOURCE OF A VOICE SIGNAL

(75) Inventor: Kandiah Ramanan, Markham (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/216,971

(22) Filed: Dec. 21, 1998

(51) Int. Cl.[7] .................................................. G10L 15/00
(52) U.S. Cl. ........................ 704/270; 704/251; 379/88.19
(58) Field of Search ................................... 704/270, 231, 704/251, 253; 379/80, 88.01, 88.12, 88.19, 88.22

(56) References Cited

U.S. PATENT DOCUMENTS

| | | | | |
|---|---|---|---|---|
| 4,284,846 | * | 8/1981 | Marley | 704/253 |
| 4,941,168 | * | 7/1990 | Kelly, Jr. | 379/69 |
| 5,007,000 | | 4/1991 | Baldi | 364/513.5 |
| 5,371,787 | * | 12/1994 | Hamilton | 379/386 |
| 5,404,400 | * | 4/1995 | Hamilton | 379/386 |
| 5,533,118 | * | 7/1996 | Cesaro et al. | 379/386 |
| 5,581,602 | * | 12/1996 | Szlam et al. | 379/67 |
| 5,644,624 | * | 7/1997 | Caldwell | 379/69 |
| 5,724,420 | * | 3/1998 | Torgrim | 379/372 |

* cited by examiner

Primary Examiner—David Hudspeth
Assistant Examiner—Abul K. Azad

(57) ABSTRACT

Methods of estimating if a voice signal is more likely formed by a machine or human, are disclosed. The methods are particularly well suited for use in an automated call establishment system. A voice signal is received at a computing device. Speech recognition steps are applied to the voice signal to recognize spoken words in the signal. Recognized words are compared to words likely generated by a machine or a live human. Based on the comparison, an estimate is made that the voice signal more likely originates with a machine or a human. Conventional call progress tone recognition may be combined with speech recognition to obtain an improved estimate of call progress. As a result of the methods, calls to machines may be disconnected or connected to a pre-recorded message, while calls to humans may be connected to call handling agents or a different pre-recorded messages. An automated call establishment system using the methods is also disclosed.

20 Claims, 4 Drawing Sheets

METHOD AND SYSTEM FOR ESTIMATION OF A SOURCE OF A VOICE SIGNAL

FIELD OF THE INVENTION

The present invention relates to estimating origins of a voice signal, and more particularly to a method and system used to estimate if a voice signal is formed by a machine or a human. The method and system are particularly well suited for use in an automated telephone call establishment system.

BACKGROUND OF THE INVENTION

Automated call establishment systems, often referred to as telephone dial systems, are known in the art. These systems are often used to deliver pre-recorded messages or connect call handling agents to telephone subscribers. Typically, such systems automatically dial pre-identified telephone subscribers and present the pre-recorded message or call handling agents to the subscribers once a placed call has been answered.

Call progress analysis techniques are often used to assess if a call has been answered, and if so, if the call has been answered by a human or machine. If the call is answered by a machine, it may be undesirable to connect a call handling agent to the call, instead a specific pre-recorded message might be played or the call may disconnected. Similarly, calls answered by a human may be transferred to an agent, or presented with a different pre-recorded message.

Typically, such techniques rely on call progress tones generated by telephony equipment related to a far end subscriber. Often such call progress tones are unavailable, or imperceptible. Other techniques analyze the energy of a far-end call signal. However, such techniques cannot typically distinguish a live human voice from a pre-recorded voice, as is often generated by an answering machine; interactive voice response ("IVR") unit, or the like.

Accordingly, an improved technique that may be used in assessing call progress in a call establishment system, and that may estimate the source of a far-end voice signal that may originate with a live human or a machine is desirable.

SUMMARY OF THE INVENTION

In the present invention, speech recognition techniques are applied to a voice signal to estimate whether the voice signal likely originates with a live human or a machine.

In accordance with the present invention, a voice signal is received at a computing device, preferably as a result of an established call connection. Speech recognition is applied to the voice signal to form indicators of recognized spoken words in the voice signal. The formed indicators are compared to one or more stored indicators identifying words likely generated by a machine or a human. As a result of the comparison an estimate if the voice signal is more likely formed by a machine or a human is made.

In accordance with another aspect of the invention, a call may be classified as likely originating with a machine voice source or a human voice source by counting the number of words in the voice signal prior to a significant pause.

Preferably, speech recognition is combined with receipt and recognition of conventional call progress indicators to estimate if a call connection has been made to a machine or human.

Advantageously, call progress analysis in call establishment systems is improved significantly through use of the present invention.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In figures, which illustrate by way of example only, embodiments of the present invention.

DETAILED DESCRIPTION

Figure 1:
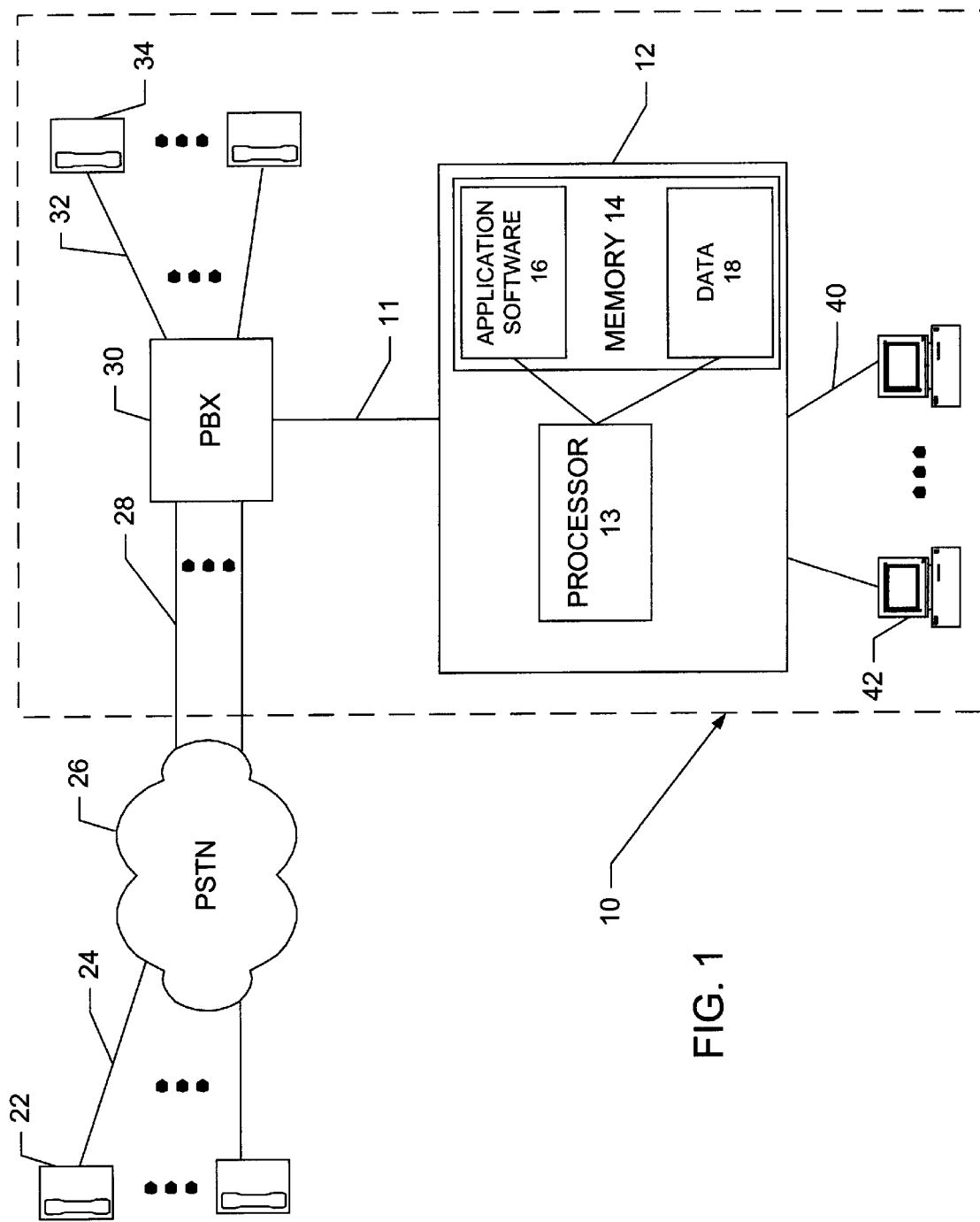
FIG. 1 is a block diagram of a telephone network interconnected with an automated call establishment system, exemplary of an embodiment of the present invention.

FIG. 1 illustrates an automated call establishment system 10, exemplary of a preferred embodiment of the present invention. Call establishment system 10 comprises a private branch exchange telephone switch 30 ("PBX") interconnected with a software enhancement application server 12 by link 11; administrative terminals 42 interconnected by links 40 to server 12; and agent stations 34 interconnected with PBX 30 by links 32.

As will become apparent, call establishment system 10 may be used as a telephone solicitation system, used for example, as a telephone sales system in order to allow associated agents at agent stations 34 to establish telephone call connections with potential customers in order to sell, or offer for sale, products or services. Alternatively, as will be appreciated, system 10 could reproduce first pre-recorded voice messages stored at server 12 or PBX 30 to connected calls in a manner known to those skilled in the art.

PBX 30, and hence system 10, are further interconnected with the public switched telephone network ("PSTN") 26 by telephone trunks 28. PBX 30 thus acts as a network interface interconnecting system 10 to the PSTN. Telephone subscribers having conventional telephones 22 or similar equipment are also interconnected with PSTN 26 by telephone lines 24.

PBX 30 may, for example, be a conventional NORTEL NETWORKS MERIDIAN M-1 PBX, as described in the NORTEL NETWORKS publications, "Meridian 1, Option 11C, General Information and Planning Handbook", NTP 55-3021-200, July 1996 and "Meridian 1, Option 11C, Software Installation Program Guide", NTP 553-3021-310, September 1996; and "Meridian 1, Option 11C, Installation Guide", NTP 553-3021-21, July 1996, available from NORTEL NETWORKS of Ottawa, Canada, the contents of which are hereby incorporated by reference, but adapted in a manner exemplary of the present invention. PBX 30 could alternatively be replaced with any other suitable telephony switch which could form part of PSTN 26, or other suitable network interface.

Software enhancement server 12 may be a conventional NORTEL MERIDIAN APPLICATION SERVER PBX enhancement software server, running CALL PILOT SOFTWARE, and modified in a manner exemplary of the present invention used to provide enhanced software based telephony services at PBX 30. As such, server 12 is preferably a conventional microprocessor based computing device, such as a conventional INTEL X86 based computer.

The NORTEL MERIDIAN APPLICATION SERVER and CALL PILOT SOFTWARE, are, for example detailed in the NORTEL NETWORKS publications, "Meridian Application Server, 702t Installation and Maintenance Guide", PO884909, September 1998, "Call Pilot Software Installation Guide" NTP 555-7101-200; and "Call Pilot Advanced Administration Guide Books", November 1998, 555-7101-300, the contents of all of which are hereby incorporated by reference.

As further illustrated in FIG. 1, server 12 comprises a processor 13 interconnected with computer readable memory 14. Additionally, interconnected with processor 13 are one or more interfaces (not illustrated), permitting server 12 to communicate with terminals 42 and PBX 30. Processor 13 is preferably a conventional microprocessor, such as an INTEL x86 family microprocessor, while memory 14 is preferably any suitable combination of random access memory ("RAM"), read-only-memory ("ROM", or other solid state, magnetic or optical memory. Server 12 further comprises a reader (not illustrated) capable of reading data and software from a computer readable medium, such as a diskette, CD-ROM, tape or the like into memory 14. As detailed below, memory 14 stores computer operating system software; application software 16; and data 18 adapting an otherwise conventional computing device to act as PBX enhancement software server 12.

Terminals 42 are also preferably conventional computing devices, such as INTEL x86 based computers, comprising one or more conventional operator input devices such as a keyboard, mouse, and display. Most preferably, terminals 42 are capable of presenting users, typically supervisors, a graphical user interface ("GUI"), displaying system information and statistics and allowing configuration of the system 10. Accordingly, each terminal 42 may store and execute client versions of software, running under a computer operating system, such as for example, MICROSOFT WINDOWS 95 or NT, providing a suitable GUI. As will be appreciated, terminals 42 could alternatively be conventional text-based video display terminals such as DEC VT100 terminals, or the like.

Call handling agents are preferably stationed at agent stations 34, in order to process outgoing calls. Agent stations 34 may be conventional telephones. Typically, agent stations 34 further comprise user or agent terminals (not shown) for displaying call related information to agents at stations 34. As noted, agent stations 34 could be eliminated if system 10 were adapted to reproduce pre-recorded audio messages.

Figure 2:
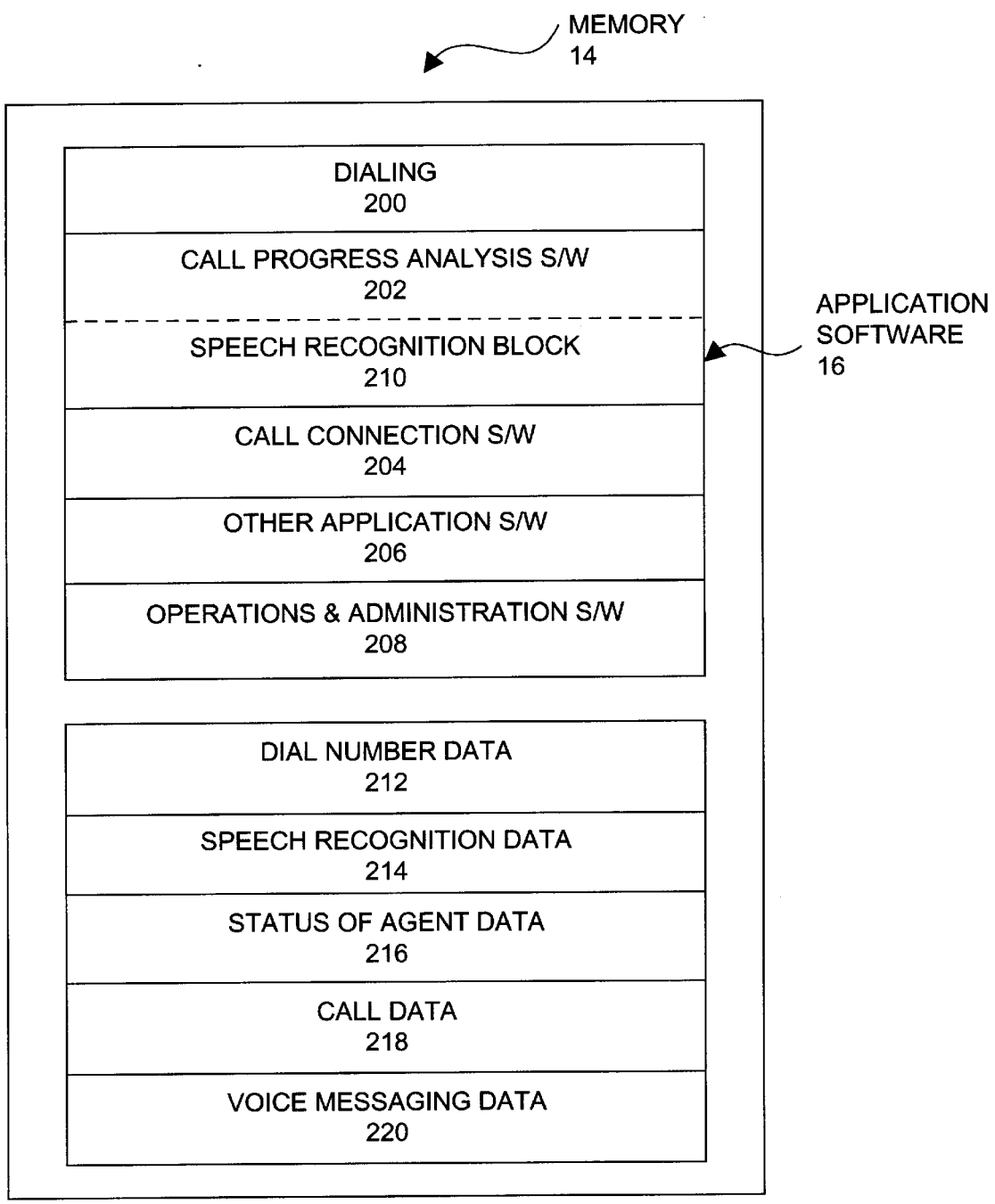
FIG. 2 is a block diagram illustrating an exemplary organization of computer memory forming part of the call establishment system of FIG. 1.

FIG. 2 illustrates an exemplary organization of software blocks or routines forming part of application software 16 within memory 14, and data 18 resulting from, or controlling application software 16, also stored within memory 14. As will be appreciated, machine executable versions of application software 16 is actually stored within memory 14. As well, executable version of operating system software, such as the UNIX operating system, or MICROSOFT WINDOWS or WINDOWS NT software is also preferably stored within memory 14, but not illustrated.

Application software 16 may be formed using programming techniques, development tools and libraries known to those skilled in the art. As illustrated, application software 16 may be organized in functional blocks including dialing software block 200; call progress analysis software block 202; call connection software block 204; other application software 206; and operations and administration ("O&A") software block 208. Application software 16 adapts call establishment system 12 to function in accordance with methods exemplary of the present invention.

As such, application software 16 uses and maintains data 18 within memory 14. Data 18 includes dial number data 212; speech recognition data 214; status of agents data 216; call data 218; and voice messaging data 220. Data 212, 214, 216, 218 and 220 are typically data sets or structures created, used or maintained by application software 16 within memory 14. As well, data 212, 214, 216, 218, and 220 may be modified as required by an end-user or administrator at terminals 42.

Dial data 212, is typically a data set containing PSTN dial numbers of PSTN subscribers, such as subscribers 22, that may be potentially dialed by system 12, typically identified as potential customers from whom telephone orders are to be solicited or to whom telephone messages are to be provided. Additionally, dialing data 212 may contain ASCII data identifying dialed parties by name; address; age; and other information that may be relevant in dialing a PSTN subscriber, such as a potential purchaser of, or subscriber to, a product or service. Dial data 212 may be obtained by operators of system 10, from, purchased mailing lists; customer lists; or other conventional sources.

Speech recognition data 214 is data used by call progress analysis software 202 in order to assess call progress in a manner exemplary of the present invention. Speech recognition data 214 preferably contains enough speech recognition data to recognize several thousand common spoken words using convention speech recognition techniques known to those skilled in the art. As will be appreciated, fewer specific words could be used for the present application. Additionally, speech recognition data 214 comprises identifiers of "key" words, that when recognized, may be used to estimate the origin of spoken voice at the far end. The nature of these indicators and "key" words are detailed below.

Status of agent data 216 is typically a dynamically updated data set having entries for each agent at agents station 34 indicating the current status of the agents at agent stations 34, including whether or not a particular agent is present at a particular station; whether an agent is occupied; the duration for which the agent has been occupied; and other data that may be relevant to assigning an outgoing call to an agent.

Call data 218 is also dynamically updated data set and represents information about calls placed by system 10, possibly including, a number of unsuccessful call attempts; time of call information; length of call; or call commentary input by, for example, an agent at one of stations 34, or other relevant call information known to those skilled in the art.

Voice messaging data 220 stores pre-recorded audio messages for playback by system 10 to connected PSTN subscribers or answering devices. Messaging data 220 may, for example, be stored pulse code modulated ("PCM") data corresponding to voice announcements, or advertisements. It could be recorded at terminals 42 or elsewhere, using conventional techniques. Alternatively, message data could be data used to create synthesized speech messages.

Dialing software block 200 adapts call system 12, and particularly PBX 30 to originate calls on trunks 28 to subscribers of PSTN 26, such as subscribers 22, using dial numbers stored within dial data 212. Call progress software block 202 in combination with call connection software 206 routes completed calls to agents at agent stations 34.

Call progress software block 202 includes a speech recognition block 210. Speech recognition block 210 allows for the recognition of speech data representing spoken words, typically in PCM format, and conversion to an equivalent ASCII word in accordance with speech recognition techniques. Speech recognition block 210, may for example, be a commercially available software speech recognition program or library, as for example available from Lernout & Hauspie Speech Product, N.V. of Ieper, Belgium or other software known to those skilled in the art, using speech recognition data 214.

O&A software block 206 is wholly or partially responsible for adapting system 10 to display user definable system parameters on terminals 42. Further O&A software block 206 allows for the variation of data stored within data memory 14 by way of terminals 42. For example, O&A software block 206 allows for the variation, and loading of dial number data 212; for the re-assignment of speech recognition data 214; and for the updating of status of agent data 216.

Other application software 206 such as digit collection; fax software; and message waiting software; and the like may also form part of application software 16, further adapting system 10 to provide services not directly related to the present invention.

Figure 3:
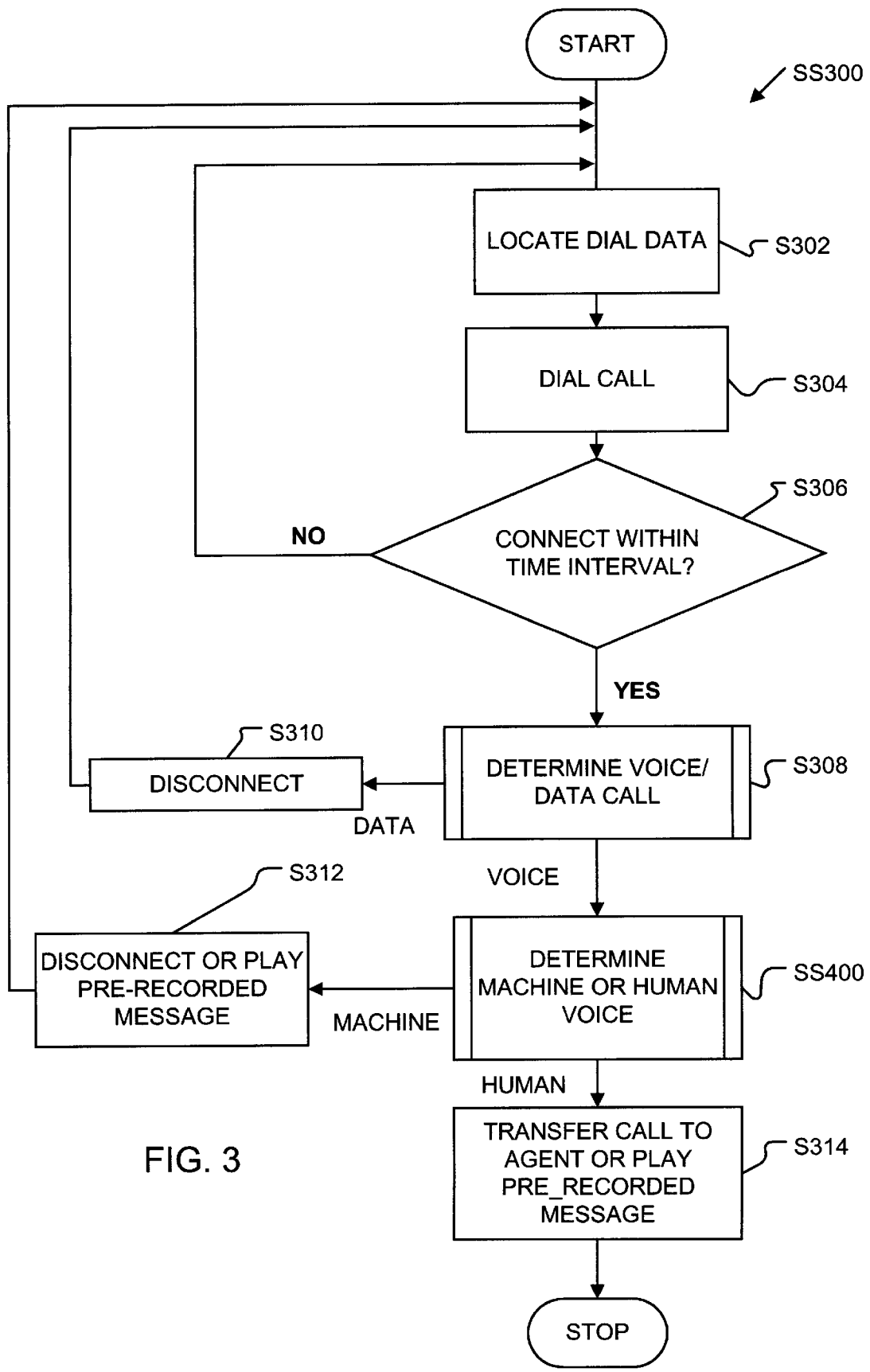
FIGS. 3 and 4 are flowcharts illustrating steps performed by the call establishment system of FIG. 1, in a manner exemplary of an embodiment of the present invention.

Steps SS300, exemplary of methods embodying the present invention and performed by system 10, under control of application software 16 in order to connect an outgoing call, are illustrated in FIG. 3.

As illustrated, in operation, dialing software block 200 initiates an outbound call by querying dial number data 212 in step S302 to locate the PSTN dial number of a party to whom a call is to be placed. Dialing software block 200 may, for example, query call data 218 to locate the first entry in dial data 212 to whom a call has not been successfully completed. PBX 30 calls a corresponding dial number using a line of one of trunks 28 in step S304.

Once a call has been placed, server 12 under control of call progress analysis software block block 202 and in communication with PBX 30 monitors and analyzes the progress of the placed call in steps S306, S308 and routine SS400.

Preferably, call progress analysis software block 202 monitors the placed call, in-band, to listen and detect standard call progress tones in step S306, to assess whether or not the placed call has been connected. Additionally, or alternatively, software block 202 may monitor out-of band signaling information provided to PBX 30 by way of trunks 28. This signaling information may be provided by way of an ISDN, CCS7, C7 or other out-of band signaling channel known to those skilled in the art.

If a placed call is not connected in an acceptable time period, such as for example, 10 seconds, as determined in step S306, steps S302 and onward are repeated, and a next appropriate dial number is chosen from dial data 212.

Once the placed call has been connected, call progress analysis software block 202, also in step S308, may further utilize tone detection techniques to assess whether or not the connected call has been connected to a data connection, such as a facsimile machine, modem, pager or the like in step S308. As understood by those skilled in the art, these far-end data connections are typically the source of tones characteristic of a connected device.

Often, call progress tones and similar tones indicative of the nature of a call connection are not available to be detected. As such, call progress analysis software block 202 preferably additionally uses traditional energy analysis techniques or zero crossing techniques as, for example, detailed in U.S. Pat. No. 5,007,000 to assess connection to voice source in step S306 and S308. If an assessment is made that the connected call is likely not a voice-call, the call is disconnected in step S310, and steps S302 onward are repeated.

If and when, a voice connection has been detected, server 12 under control of automatic voice recognition block 210, of call progress analysis software 204 analyzes spoken voice at the far end of the placed call to estimate whether or not the spoken voice originates with a live human speaker, or with an automated device, such as an answering machine, an interactive voice response unit, or the like in routine SS400. Steps performed in routine SS400 are illustrated in FIG. 4.

Figure 4:
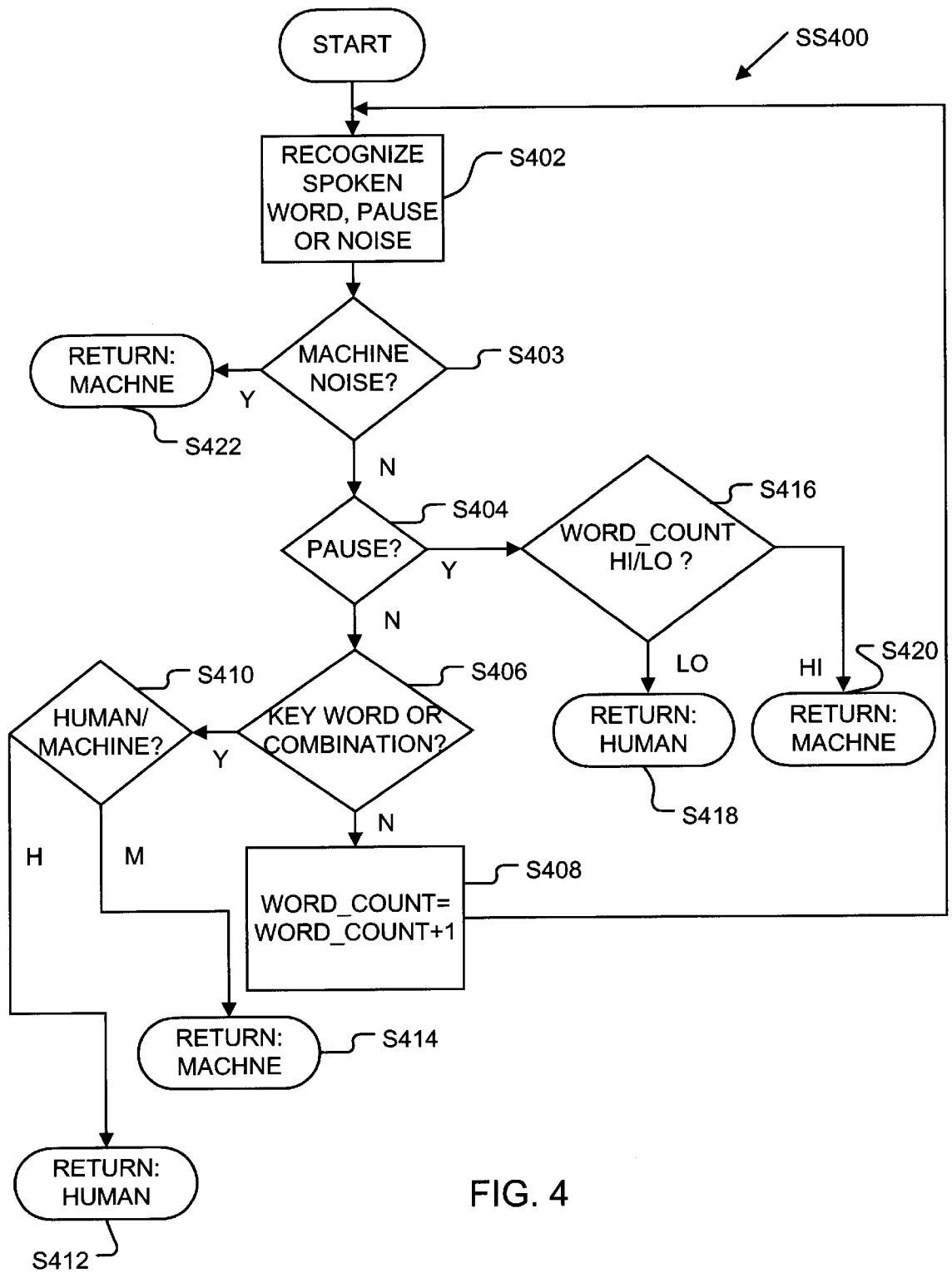

As illustrated, speech recognition block 210 preferably attempts to recognize each spoken word and convert that word call to ASCII data for analysis by the remainder of call progress analysis software block 202 in step S402 (FIG. 4).

As well, noise attributable to conventional magnetic tapes used in typical answering machines at the far end of the connected call, may be detected in step S402. As understood by those skilled in the art, magnetic tapes may be the source of characteristic white noise, that is minimized in many hi-fidelity tape player using known noise reduction techniques. Conventional tape based answering machines typically, however, do not include noise reduction components. Thus, if characteristic tape noise is detected, as determined in steps S403 routine SS400 exits with a MACHINE return code indicating a call connection with a machine, in step S422.

Additionally, block 210 detects a pause in excess of a defined duration, such as 1 second in step S402. If a pause is detected, in step S404, call progress analysis software block 202 compares a WORD—COUNT variable maintained in steps S416 to assess whether or not the number of spoken words, since the establishment of the call exceeds a defined threshold. This is used as a first indicator that the spoken voice may originate with a human or machine. That is, typically, a human speaker's response will consist of fewer words than a machine response. Accordingly, if the WORD—COUNT variable exceeds the threshold, routine SS400 exits with a return code indicating a machine voice in step S420. If the WORD—COUNT variable does not exceed the threshold, routine SS400 exits with a return code indicating a human voice in step S420. An appropriate threshold to detect a machine may, for example, be between eight and twenty words.

If no significant pause is encountered, as determined in step S404, call progress analysis software block 202 attempts to correlate the data representing the recognized spoken words, to words, phrases or groups of words typically generated by machines, such as VMSs; IVRS; answering machines or the like; or typically generated by a live human speaker That is, specific recognized phrases may be indicative of an automated device, or a human.

Conveniently, as noted, speech recognition data 214 preferably also includes indicators representative of trigger words, phrases or combinations of words used to make the estimation that a connected call is to a human or machine.

These indicators may for example, be ASCII representations of the "key" words. Conveniently, these indicators may be updated by an administrator at terminals 42, as required. Specifically, if currently used trigger words are not sufficient to screen a majority of non-human answers, the list may be augmented by more relevant phrases, words, or combinations of words. As will be appreciated, the trigger words may comprise individual stored words; phrases; or combination of spoken words. As such, software 16 preferably buffers words recognized since the establishment of a call so that past recognized words may be considered in step S406.

Example "key" words and phrases in the English language and typically used in North American IVRs or answering machines that may be used as trigger words or phrases and therefore stored in voice recognition data 214, may include phrases such as "Leave"; "Message"; "Unable"; Answer"; "After"; "Tone"; "Numeric"; "Number"; "Touch"; "Pad"; "Key"; "Pound"; "Reached"; "Voicemail"; "Sorry" and "Residence". As will be appreciated by a person skilled in the art, this list of example phrases is in no way exhaustive. Many other words, and phrases may similarly be highly suggestive of a non-human answer. As will be appreciated, the methods of this invention are not limited to the English language. "Key" words and phrases will vary from language to language, and even from locale to locale.

English words and phrases that may be highly suggestive of a human speaker, and therefore stored as "key" words identifying a human speaker in data 214, include the terms "Speaking"; "Help"; "Who".

All these "key words" are used and analyzed in steps S406 to S410. That is, if a key word or combination is recognized, as determined in step S406, call progress analysis software block 202 assesses whether or not the key word or combination likely represent a human or machine in step S410. If the key word or combination likely originates with a human speaker, determined as outlined above, routine SS400 returns with a HUMAN speaker code in step S412.

Similarly, upon recognizing a stored key word, phrase or combination of words representative of a non-human speaker, call progress analysis software block 202 makes estimates that the call has likely been answered by a machine, in step S410 and returns to steps SS300 with a MACHINE speaker return code in step S414.

In the event no "key" word is recognized, the above mentioned WORD_COUNT variable is incremented in step S408, and the next spoken word is listened for. Steps S402 onward are repeated. It is worth noting that speech recognition block 210 need not actually recognize a word in order for step S408 to be performed. That is, as long as speech recognition block 410 recognizes a transition from one word to another, steps S404, S406 and S408 may be performed.

Once routine SS400 returns the required code representative of an estimation that a connected call is to a human or machine speaker, control of the call may be handed to call connection software block 204 in steps S312 and S314. Call connection software block 204, in response may disconnect the call in the event an assessment is made that the call has likely been answered by a machine, as indicated by a MACHINE return code from routine SS400, in step S312. Alternatively, call connection software block 204 may replay a second stored pre-recorded message stored within message data 220, that may for example, be suitable for recording at an answering device at the far-end. In the event an assessment has been made that the call has likely been answered by a human speaker, as represented by the return code provided by routine SS400, the call may be connected to one of the call handling agents at an available station 34, as assessed by probing status of agent data 216, also in step S314. Alternatively a first pre-recorded message stored within message data 220 may be replayed.

If an agent is not available, pre-recorded music or a message generated at PBX 30 in a manner known to those skilled in the art, may be played until an agent becomes available.

Once a call is connected to an agent at one of agent stations 34, accompanying data stored within dial number data 212 may be presented to a terminal at station 34. This data may include the called party's name, and other relevant information allowing an agent to properly communicate with the called party. An agent at station 34, may also optionally record typed comments representative of observations made during a connected call. These comments may also be stored in call data 218.

While the organization of software blocks, steps, data and data structures have been illustrated as clearly delineated, a person skilled in the art will appreciate that the delineation between blocks and data is somewhat arbitrary. Numerous other arrangements of software blocks and data are possible.

As well, while call progress analysis; speech recognition; noise detection; and tone detection in the preferred embodiment are preformed by a single processor, such detection may be preformed by several processing elements, including digital signal processors, in communication with each other. As well, while counting the number of words prior to a significant pause is achieved in the preferred embodiment using speech recognition software, a person skilled in the art will appreciate that a count of words could easily be maintained by perceiving gaps or pauses between spoken words without use of recognition software.

Similarly, while the above described embodiment has been described in the context of a conventional PSTN, the invention may be used in other settings, such as in a wireless or packet switched network used to carry voice.

Finally, it will be understood that the invention is not limited to the embodiments described herein which are merely illustrative of a preferred embodiment of carrying out the invention, and which are susceptible to modification of form, arrangement of parts, steps, details and order of operation. The invention, rather, is intended to encompass all such modifications within its spirit and scope, as defined by the claims.

What is claimed is:

1. A method of operating an automated call establishment system including a computing device, said method comprising:
   a. establishing a call connection with a far-end;
   b. receiving at said computing device a voice signal originating with a voice source at said far-end;
   c. applying speech recognition to said voice signal at said computing device to form indicators of recognized spoken words in said voice signal;
   d. comparing said formed indicators to one or more stored indicators stored at said computing device identifying words likely generated by one of a machine and a human voice source;
   e. classifying said voice signal as likely originating with one of a machine voice source and a human voice source, based on said comparing.

2. The method of claim 1, further comprising:
   receiving at least one tone signal, indicative of call progress to determine if said call connection has been established.

3. The method of claim 1, further comprising: receiving at least one out-of band telephony signal, indicative of call progress to determine if said call connection has been established.

4. The method of claim 3, wherein said out-of band telephony signal is one of an SS7 and ISDN signal.

5. The method of claim 1, further comprising:
   counting words in said voice signal prior to a significant pause, and classifying said voice signal as originating with one of a machine voice source and a human voice source, based on said number of counted words prior to said significant pause.

6. The method of claim 5, wherein said voice source is classified as a machine voice source if said number of counted words prior to said pause exceeds a defined threshold number of words.

7. The method of claim 1, further comprising detecting noise characteristic of a magnetic audio tape in said voice signal, and classifying said voice signal as originating with a machine, in response to detecting said noise characteristic of a magnetic audio tape.

8. The method of claim 1, further comprising:
disconnecting said call connection if said voice source is classified as a machine voice source.

9. The method of claim 1, further comprising:
transferring said call connection to a call handling agent if said voice source is classified as a human voice source.

10. The method of claim 1, further comprising:
playing a first recorded message over said call connection, if said voice source is classified as a machine voice source.

11. The method of claim 1, further comprising: playing a second recorded message over said call connection, if said voice source is classified as a human voice source.

12. A method of estimating if a voice signal is more likely formed by a machine or human, comprising:
a. receiving said voice signal at a computing device;
b. applying speech recognition to said voice signal at said computing device to form indicators of recognized spoken words in said voice signal;
c. comparing said formed indicators to one or more indicators stored at said computing device identifying words likely generated by one of a machine and a human;
d. estimating if said voice signal is more likely formed by a machine or a human based on said comparing.

13. The method of claim 12, wherein said voice signal is received as a result of establishing a call connection with a far end voice source.

14. The method of claim 13, further comprising:
counting words in said voice signal prior to a significant pause, and wherein said estimating is based on said number of counted words prior to said significant pause.

15. A call establishment system comprising:
a network interface for connection with a communications network;
a processor in communication with said interface;
processor readable memory in communication with said processor, said memory storing instructions adapting said system to:

a. establish an outgoing call using said network interface;
b. receive a voice signal from a far-end of said outgoing call;
c. apply speech recognition to said voice signal to form indicators of recognized spoken words in said voice signal;
d. compare said formed indicators to one or more stored indicators identifying words likely generated by one of a machine and a human voice source;
e. classify said voice source as a machine or human voice source.

16. The call establishment system of claim 15, further comprising an input device for modifying said stored indicators.

17. The call establishment system of claim 15, wherein said memory further stores processor readable instructions to while establishing a call, detect at least one tone signal indicative of call progress to determine if a call connection has been established.

18. A call establishment system comprising:
means for establishing an outgoing call;
means for recognizing speech in a voice signal at a far end of said outgoing call;
means for comparing said recognized speech to words likely generated by one of a machine and a human voice source;
means for classifying said voice source as a machine or human voice source in communication with said means for comparing.

19. The system of claim 18, further comprising:
means for detecting noise characteristic of a magnetic audio tape in said voice signal, and
means for classifying said voice signal as originating with a machine, in response to said means for detecting, detecting noise characteristic of a magnetic audio tape.

20. A method of operating an automated call establishment system, including a computing device, said method comprising:
a. establishing a call connection with a far-end;
b. receiving a voice signal from said far-end at a computing device;
c. recognizing words within said voice signal using speech recognition;
d. counting a number of recognized words in said voice signal prior to a significant pause in said voice signal;
e. classifying said voice signal as likely originating with one of a machine voice source or a human voice source, based on said number of recognized words.

* * * * *